US012620503B2

(12) United States Patent
Evans et al.

(10) Patent No.: US 12,620,503 B2
(45) Date of Patent: May 5, 2026

(54) ROLLING RADIATION SHIELD

(71) Applicant: Mettler-Toledo, LLC, Columbus, OH (US)

(72) Inventors: Michael Evans, Land O Lakes, FL (US); Steven Guindine, Lutz, FL (US); Alisher Khodjaniyazov, Land O Lakes, FL (US); Gabriel Malestein, Spring Hill, FL (US); Christopher Sisemore, Land O Lakes, FL (US)

(73) Assignee: Mettler-Toledo, LLC, Columbus, OH (US)

( * ) Notice: Subject to any disclaimer, the term of this patent is extended or adjusted under 35 U.S.C. 154(b) by 350 days.

(21) Appl. No.: 18/377,650

(22) Filed: Oct. 6, 2023

(65) Prior Publication Data

US 2025/0118452 A1 Apr. 10, 2025

(51) Int. Cl.
*G21F 3/00* (2006.01)
*G21F 1/12* (2006.01)

(52) U.S. Cl.
CPC ................ *G21F 3/00* (2013.01); *G21F 1/125* (2013.01)

(58) Field of Classification Search
CPC .................................. G21F 3/00; G21F 1/125
See application file for complete search history.

(56) References Cited

U.S. PATENT DOCUMENTS

| | | | | |
|---|---|---|---|---|
| 3,215,250 A | 11/1965 | Schubert | | |
| 6,590,956 B2 | 7/2003 | Fenkart et al. | | |
| 2008/0310597 A1* | 12/2008 | Williamson | G01V 5/20 378/147 | |

FOREIGN PATENT DOCUMENTS

| | | | |
|---|---|---|---|
| CN | 108311402 | A | 7/2018 |
| CN | 208050395 | U | 11/2018 |
| CN | 115104025 | A | 9/2022 |
| EP | 2854498 | A1 | 4/2015 |
| EP | 3100278 | B1 | 1/2020 |
| JP | 2010-127699 | A | 6/2010 |
| JP | 2011-5429 | A | 1/2011 |
| JP | 7200001 | B2 | 12/2022 |
| KR | 10-2168239 | A1 | 10/2020 |

* cited by examiner

*Primary Examiner* — Nicole M Ippolito
(74) *Attorney, Agent, or Firm* — Standley Law Group LLP; Jeffrey S. Standley; Adam J. Smith

(57) ABSTRACT

A rolling radiation shield and related systems and methods for providing radiation shielding at an imaging machine are disclosed. An imaging device is located within a housing which also accommodates a conveyor for moving objects through the housing and within imaging distance of the imagining device. The rolling radiation shield is positioned at an entrance and/or exit to the housing, and may include one or more outer portions which contacts the conveyor to cause rotational movement of the rolling radiation shield when the conveyor is activated and an axle. At least one component of the rolling radiation shield comprises material which attenuates radiation from the imaging machine.

20 Claims, 12 Drawing Sheets

ROLLING RADIATION SHIELD

CROSS-REFERENCE TO RELATED APPLICATIONS

This application is filed as original and therefore makes no priority claim.

TECHNICAL FIELD

Exemplary embodiments relate generally to a rolling radiation shield, such as for use with a conveyor, as well as systems and methods related to the same.

BACKGROUND AND SUMMARY OF THE INVENTION

X-rays are sometimes used to image objects. Generally, a conveyor is used to move objects through the x-ray machine to limit human exposure to radiation. Curtains are commonly used at the entrances to such x-ray machines, such as for radiation shielding. However, such curtains are not always suitable for various objects, including relatively small and/or lightweight objects. Such objects may have trouble passing through the curtains normally. Traditional curtains may cause products to get stuck or otherwise disturbed in position and/or orientation. This can lead to complications in imagining, handling or further processing (such as upon exit), sorting for acceptance/rejection, combinations thereof, or the like. Other known approaches to radiation shielding included extended guards, tunnels, or complex geometric features to block line of sight to primary x-ray beams. These known approaches, however, increase length of the machine and add significant cost and complexity, among other drawbacks. What is needed is a radiation shield for various objects, including but not necessarily to, relatively small and/or lightweight objects.

A rolling radiation shield and related systems and methods are provided. This shielding approach is relatively cost effective, rugged, and/or capable of handling relatively small and/or lightweight objects, among other advantages. Such objects may include, for example without limitation, certain foodstuffs and/or pharmaceuticals (packaged or otherwise). The rolling radiation shield may be connected to an imaging machine, such as an x-ray machine, or other surface. The rolling radiation shield may cover some or all of an entrance and/or an exit to the imaging machine and may be configured for rotational movement with the conveyor belt, such as by frictional engagement with the same. In this fashion, rotation of the shield may be driven by movement of the conveyor belt. In other embodiments, the rolling radiation shield may be actively driven.

The rolling radiation shield may comprise first and second outer portions, such as of generally circular shape which may contact and engage the conveyor to cause rotational movement of the shield with the conveyor. The outer portions may be spaced apart along an axle. The axle may be hollow to accommodate a shaft. Flexible strips may be connected to the axle to provide shielding. The flexible strips may comprise material which attenuates (e.g., at least partially absorbs, reflects, and/or otherwise at least partially blocks and/or weakens) radiation energy. The flexible strips may be provided in rows which are attached to the axle.

Alternatively, or additionally, the flexible strips may comprise a common portion which connects each row. The common portions may each be connected to a substrate. The substrates may be insertable into notches within the axle to secure the material to the axle.

In other exemplary embodiments, the rolling radiation shield comprises sheets extending radially from the axle between the first and second outer portions. The sheets may comprise material which attenuates radiation. The sheets may be provided in pairs.

The axle may be connected to the imaging machine or other surface by arms and brackets, which may provide joints which permit vertical movement of the shield. A series of brackets may be provided for height adjustability. The brackets may be installed interior to the housing for the imaging system.

In yet other exemplary embodiments, the rolling radiation shield may comprise an outer portion and an inner portion about the axle. The outer portion may be shaped as a hollow cylinder, and the inner portion may fill a space between the axle and the outer portion. One or both of the inner and outer portions may comprise material which attenuates radiation.

While x-rays, x-ray machines, and conveyors are sometimes discussed, the present disclosures may be utilized with other types and kinds of imaging devices and/or movement imparting mechanisms.

In exemplary embodiments, a rolling radiation shield includes a first outer portion and a second outer portion spaced apart from the first outer portion. Each of the first and second outer portion may have a circular shape. An axle connects the first outer portion and the second outer portion. Material which attenuates radiation is attached to the axle.

The material may be provided as flexible strips, which may be arranged in rows, each of which may extend along a longitudinal axis of the axle. The rows may be spaced apart about a circumference of the axle.

Notches may be provided in the axle. Common portions of the material may connect the flexible strips of a respective one of the rows. Substrates may be connected to a respective one of the common portions of the respective one of the rows. The substrates may each be inserted into one of the notches of the axle to secure the flexible strips to the axle.

A shaft extending through a hollow portion of the axle.

The material may comprise a series of sheets spaced apart circumferentially at the axle and extending radially outward therefrom.

In exemplary embodiments, a system for providing radiation shielding at an imaging machine includes the imaging machine, which includes a housing, an imaging device located within the housing which emits and detects radiation when activated, and a conveyor for moving objects through the housing and within imaging distance of the imagining device. A rolling radiation shield may be positioned at an entrance and/or an exit to the housing and includes a first outer portion, a second outer portion spaced apart from the first outer portion. Each of the first and second outer portions may have a circular shape and may contact the conveyor. An axle may connect the first outer portion and the second outer portion. Material which attenuates radiation may be attached to the axle.

The material may include flexible strips attached to the axle. The flexible strips may be arranged in rows, each of which extends along a longitudinal axis of the axle. The rows may be spaced apart about a circumference of the axle.

Notches may be provided in the axle. Common portions of the material may connect the flexible strips of a respective one of the rows. Substrates may connect a respective one of the common portions of the respective one of the rows. The substrates may be insertable into one of the notches of the axle to secure the flexible strips to the axle.

First and second arms may be provided which are connected in a jointed fashion to the axle. Brackets may be fixed to an interior of the housing and connected to the first and second arms in a jointed fashion. The brackets may be provided in two sets. Each of the brackets in the two sets may be spaced apart vertically from one another at the interior of the housing to provide height adjustable installation.

The radiation attenuating material may include a series of sheets spaced apart circumferentially at the axle and extending radially outward therefrom. The series of sheet may be arranged in pairs. Each of the sheets may be secured within slots in the axle.

In exemplary embodiments, a method for providing radiation shielding at an imaging machine includes placing objects on a conveyor which extends through a housing of the imaging machine for an imaging device, and activating the conveyor to move the objects into the housing for imaging by the imaging device, where activation of the conveyor causes rotational movement of a rolling radiation shield positioned at an entrance to the housing. Alternatively, or additionally, a rolling radiation shield positioned at an exit to the housing.

The rolling radiation shield may include a first outer portion, a second outer portion spaced apart from the first outer portion. Each of the first and second outer portions may have a circular shape. An axle may connect the first outer portion and the second outer portion. Material configured to attenuate radiation may be attached to the axle.

The material may include flexible strips attached to the axle. The flexible strips may be arranged in rows, each of which extends along a longitudinal axis of the axle. The rows may be spaced apart about a circumference of the axle.

The rolling radiation shield may be connected to an interior of said housing of said imaging machine by first and second arms connected in a jointed fashion to the axle, and brackets fixed to the housing and connected to the first and second arms in a jointed fashion.

Notches may be provided in the axle. Common portions may connect the flexible strips of a respective one of the rows. Substrates may each be connected to a respective one of the common portions of the respective one of the rows. The substrates may be configured for insertion into any one of notches of the axle to secure the flexible strips to the axle.

The radiation attenuating material may comprise a series of sheets spaced apart circumferentially at the axle and extending radially outward therefrom. The series of sheets may be arranged in pairs.

The rolling radiation shield may include an axle, an inner portion having a cylindrical shape located about the axle, and an outer portion having a hollow cylindrical shape located about the inner portion. The inner and/or outer portion may include a material which attenuates radiation.

In other exemplary embodiments, a rolling radiation shield includes an outer portion shaped as a hollow cylinder, an inner portion extending within the outer portion and shaped as a cylinder, and an axle extending through the inner portion. At least the outer portion may include material configured to attenuate radiation.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
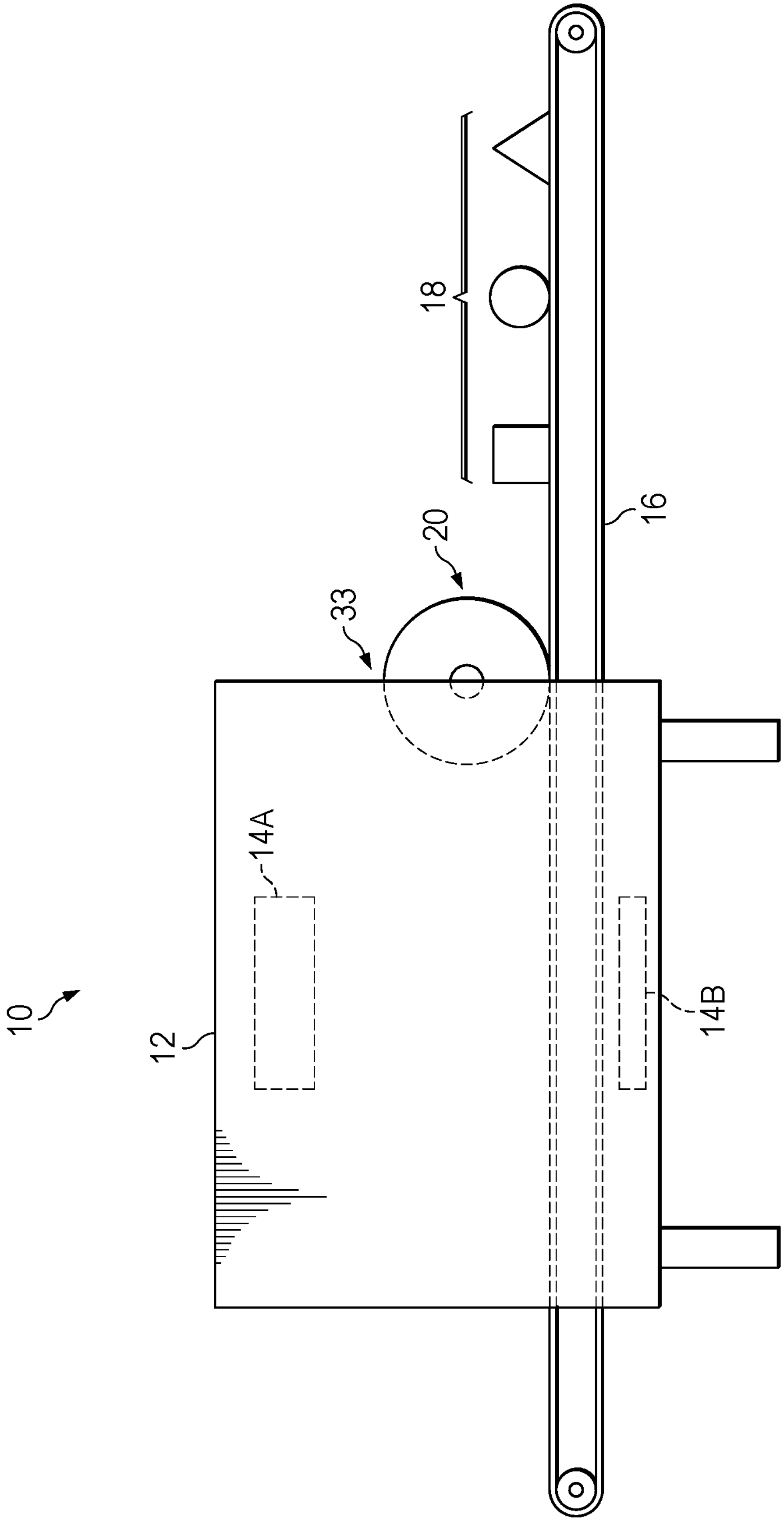
FIG. 1 is a side view of an exemplary imaging system with rolling radiation shield.

FIG. 1 illustrates an exemplary imaging system 10 (hereinafter also the "system"). The system 10 may comprise a housing 12 or other structure at least partially enclosing an imaging device 14, such as which is configured to emit and detect X-rays or other energy beams for imaging when activated. In exemplary embodiments, without limitation, the imaging device 14 comprises at least one x-ray generator 14A and at least one x-ray detector 14B. While x-rays and related equipment are discussed in many instances, other types and kinds of imagining equipment may be utilized, such as which emit and/or detect other types and kinds of radiation or other energy beams, including but not limited to visible (e.g., strobes or other photographic lighting) and/or non-visible light. Various arrangements and combinations of such imaging devices 14 may be utilized.

A conveyor 16 may be provided to carry objects 18 through the housing 12, such as to be imaged by the imagining device 14. While conveyors and related equipment are discussed in many instances, other types and kinds of movement equipment may be utilized to bring objects 18 into view of the imaging device 14.

The system 10 may include a rolling radiation shield 20 (hereinafter also the "shield"). The shield 20 may be connected to the housing 12, such as directly or indirectly. The shield 20 may be connected to an interior or exterior of the housing 12. Alternatively, the shield 20 may be mounted independent of the housing 12, such as to one or more brackets connected to a floor or other surface. Regardless, the shield 20 is preferably installed at an entrance and/or exit 33 to the housing 12 such as to reduce or eliminate radiation from exiting the housing 12 by way of an opening therein for the objects 18 to travel through. If the housing 12 has multiple entrances entrance and/or exit 33, such as for multiple conveyors 16 and/or imaging devices 14, multiple such shields 20 may be installed. Alternatively, a single shield which covers multiple entrances entrance and/or exit 33 may be employed.

Figure 2:
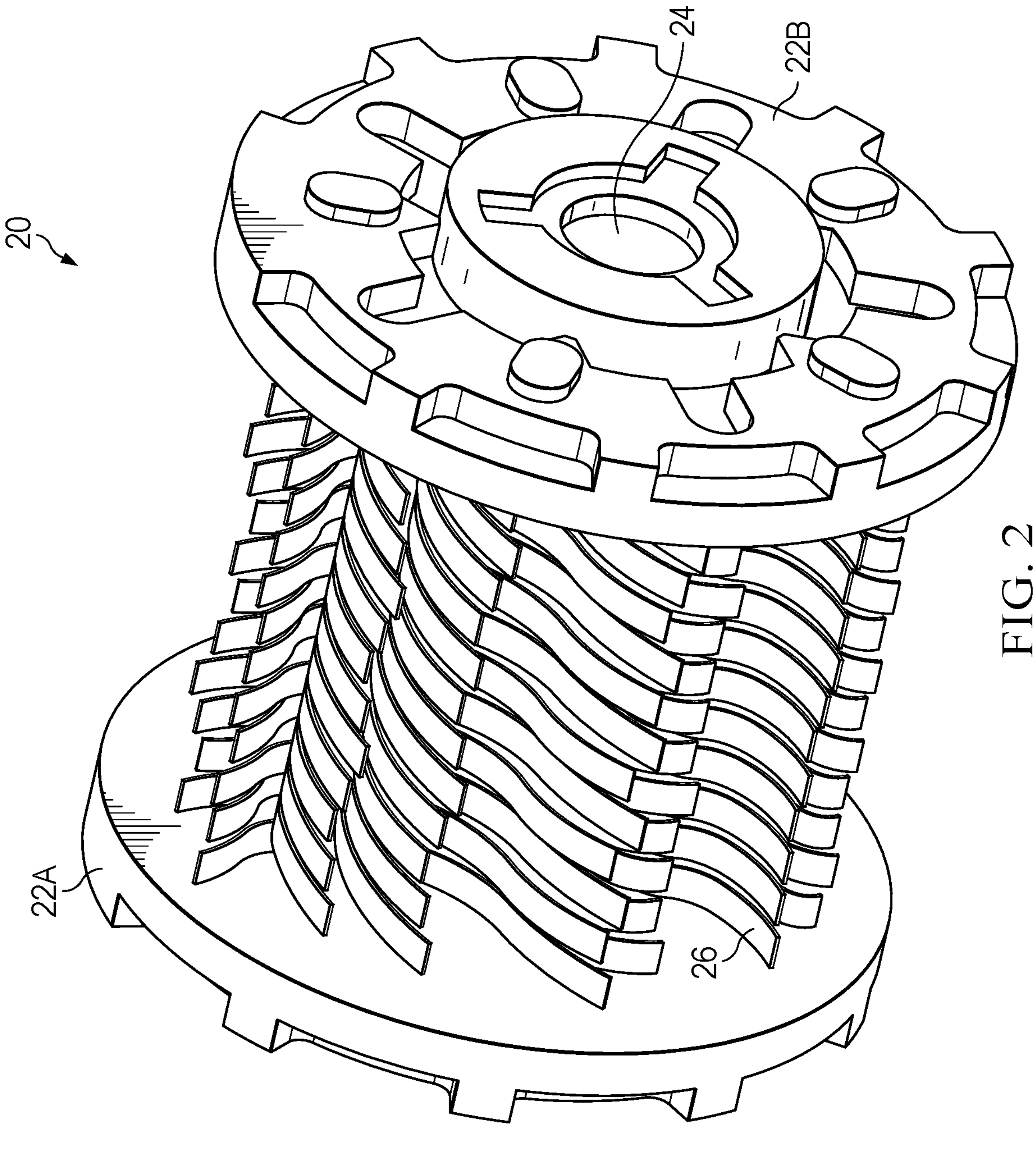
FIG. 2 is a perspective view of an exemplary rolling radiation shield for use with the system of FIG. 1 illustrated in isolation from other components of the system.
Figure 3:
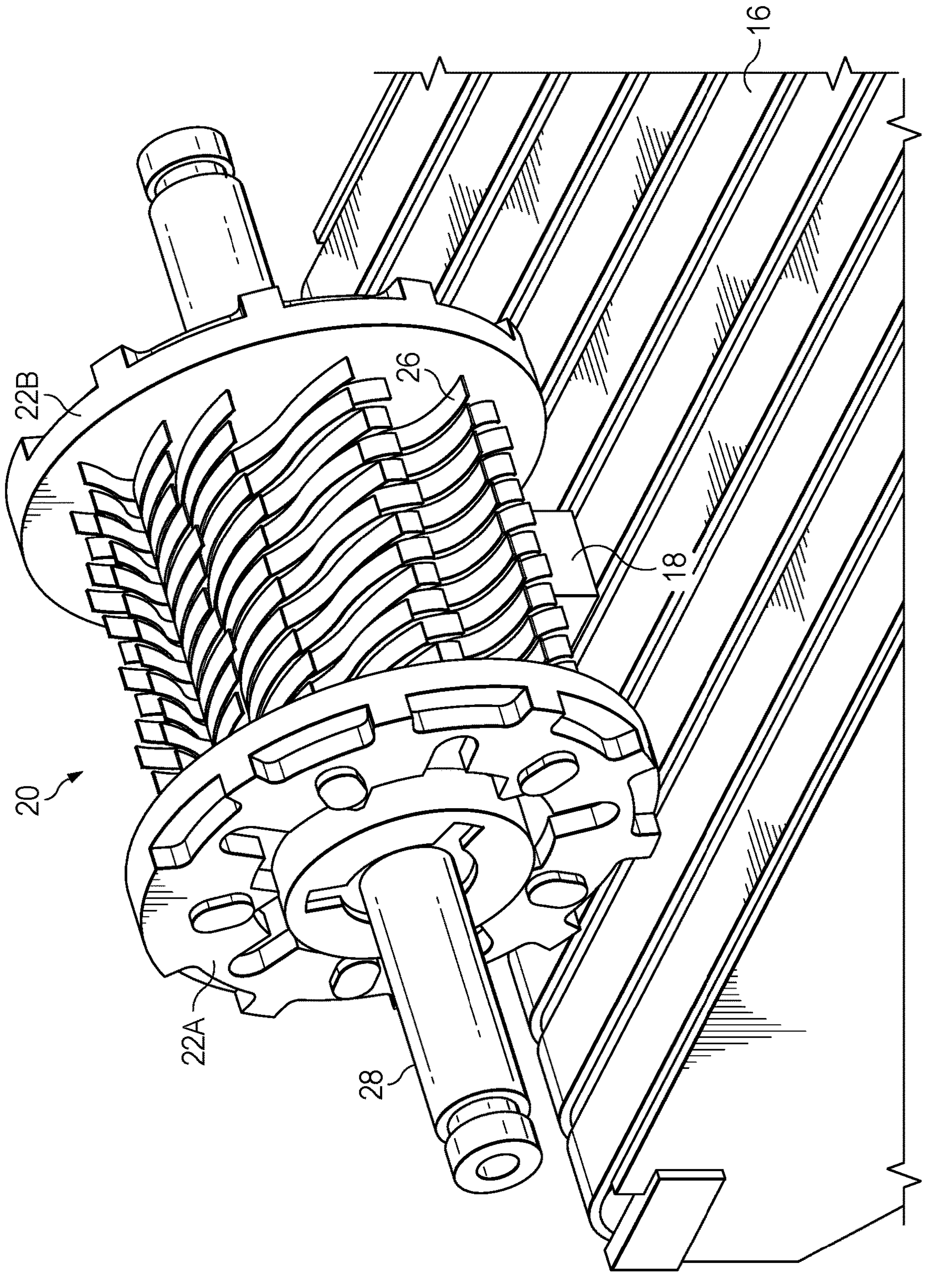
FIG. 3 is a perspective view of the rolling radiation shield of FIG. 2 in use with an exemplary conveyor, illustrated in isolation from other components.

FIG. 2 and FIG. 3 illustrates an exemplary rolling radiation shield 20. The shield 20 may take on a generally wheeled shape. In exemplary embodiments, the shield 20 may comprise first and second outer portions 22A, 22B connected in a fixed manner to an axle 24. In exemplary embodiments, the axle 24 comprises a hollow shaft connected to the outer portions 22. The outer portions 22 may comprise openings to access the hollow shaft of the axle 24. The outer portions 22 may comprise a generally circular shape.

The axle 24 may be configured to accommodate a shaft 28, such as for mounting and securing the shield 20 in a fixed position in space while also allowing rotational movement. In this fashion, the shaft 28 may remain rotationally fixed while the axle 24 rotates about the shaft 28. In this fashion, the shaft 28 may serve as an axle (e.g., an additional axle) or an axle component. One or more bearings may optionally be employed to facilitate such rotational movement.

A plurality of flexible strips 26 may be attached to the axle 24. The flexible strips 26 may comprise one or more materials configured to attenuate radiation of one or more types, such as but not limited to x-rays. Such material may comprise, by way of non-limiting example, one or more polymers, a vinyl, mylar, combinations thereof, or the like impregnated and/or blended with one or more metals, such as relatively high-density and/or molecular weight metals, such as but not limited to lead, zinc, molybdenum, barium, tungsten, bismuth, combinations thereof, or the like.

Multiple subsets of the flexible strips 26 may be provided along a longitudinal axis of the axle 24. Such subsets may be spaced apart along an outer circumference of the axle 24. In this way, a plurality of rows 27 of the flexible strips 26 may be provided along the axle 24, each of the rows 27 may include a plurality of the flexible strips 26.

The flexible strips 26 may comprise thin, relatively slender, finger-like protections which extend outward. Alternatively, or additionally, the flexible strips 26 may be provided as loops, such as which attach to the axle 24 at two locations. The flexible strips 26 may take on various sizes and/or shapes.

Preferably, the flexible strips 26 are sized to substantially reach (e.g., within 20%) an outer circumference of the first and second outer portions 22 when fully extended outwardly. In this way, the flexible strips 26 may reach a surface of the conveyor 16 when rotated, such as to fully or substantially shield the entrances(s) and/or exit(s) 33.

Figure 4:
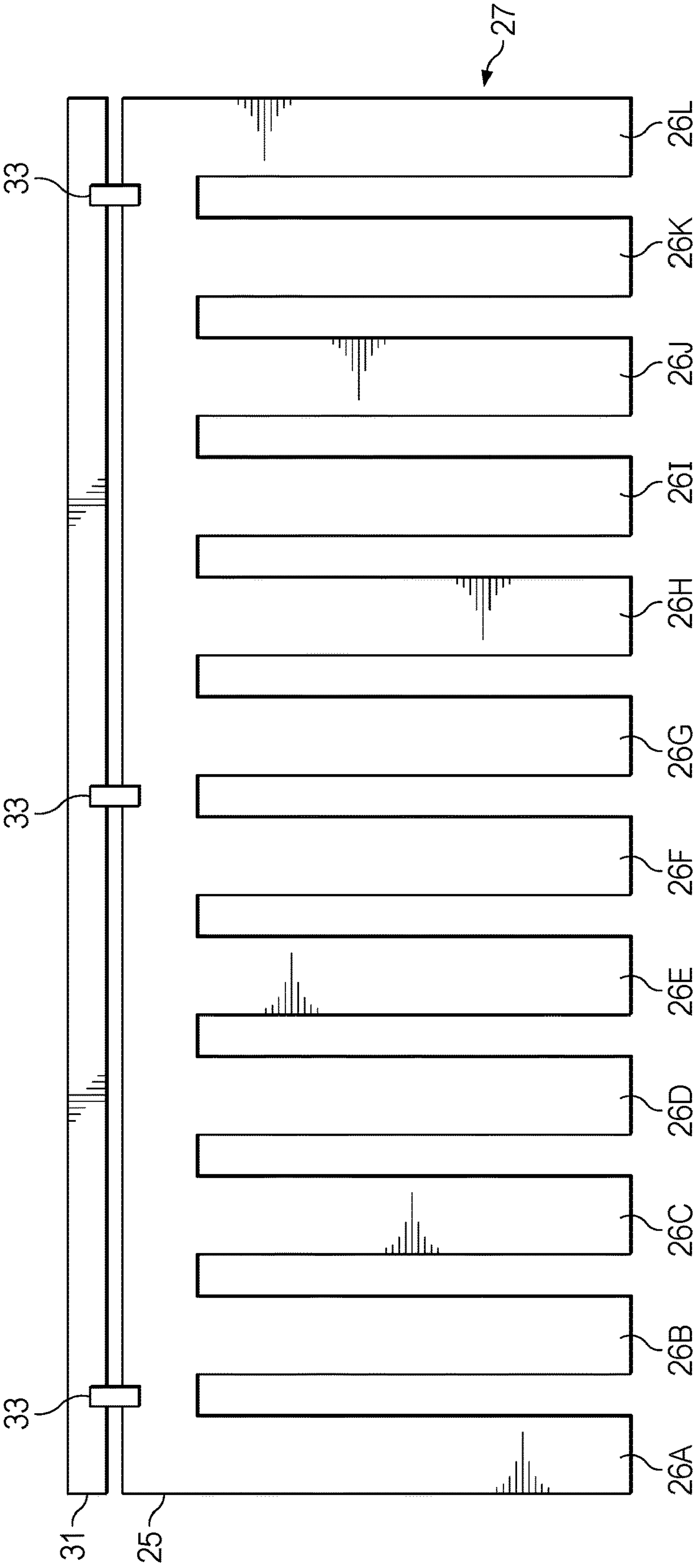
FIG. 4 is a top view of an exemplary row of flexible strips for use with the rolling radiation shield of FIGS. 2-3.

The flexible strips 26 may be connected to the axle 24 by adhesive, inserted within one or more slots, tying, fasteners (e.g., screws), combinations thereof, or the like. In exemplary embodiments, without limitation, each row 27 of the flexible strips 26A-26L may be connected by a common portion 25 of a same or different material, such as illustrated with regard to at least FIG. 4, by way of non-limiting example. The common portion 25 may be secured to the axle 24, directly or indirectly, for example. The number, size, arrangement, and the like of the flexible strips 26A-26L, common portion 25, and rows 27 is exemplary and not intended to be limiting. The strips 26 may extend on either side of each row 27, such as in either direction from the common portion 25, though such is not required.

Figure 5:
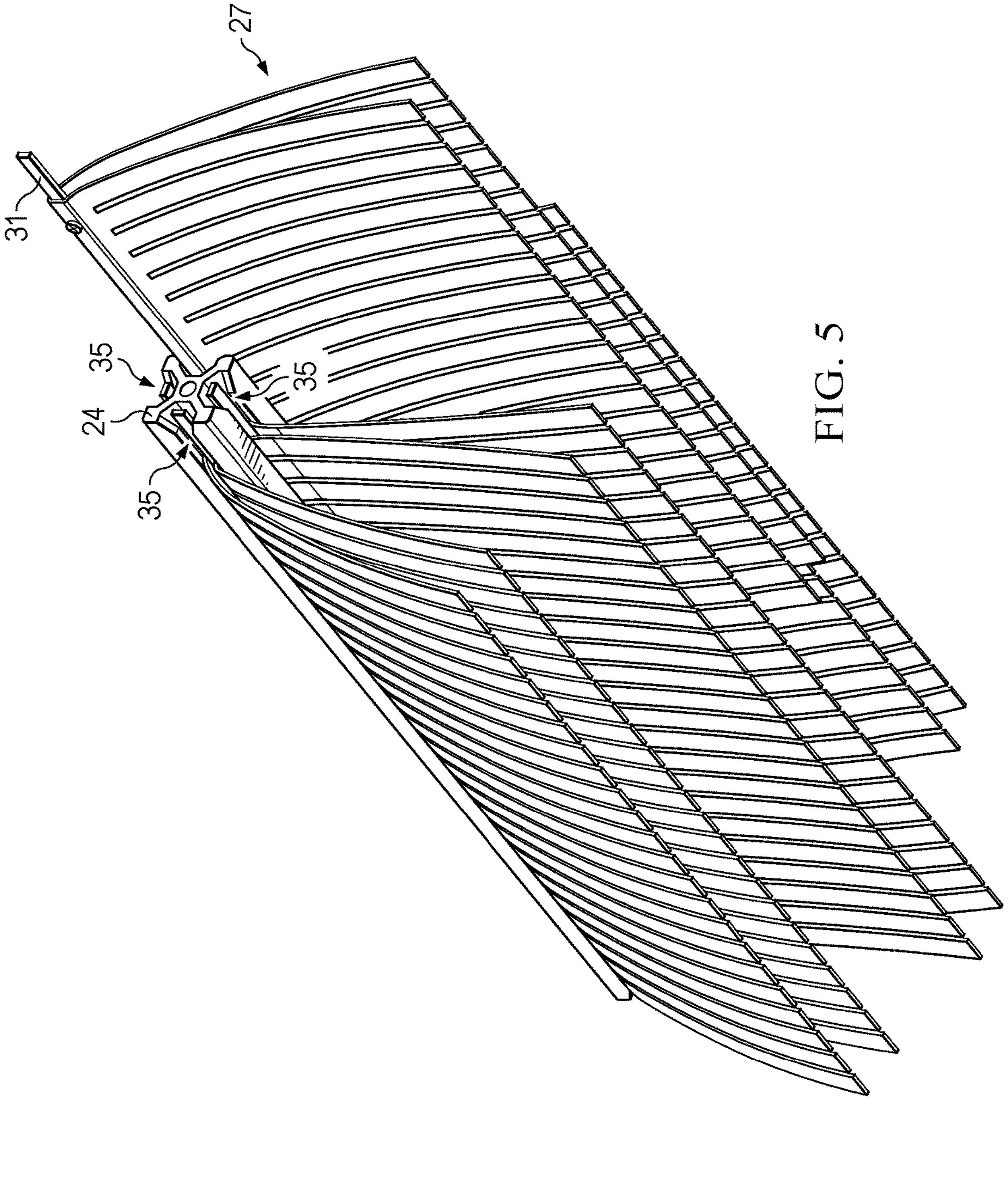
FIG. 5 is a perspective view of the flexible strips partially installed at the axle of the rolling radiation shield.
Figure 6:
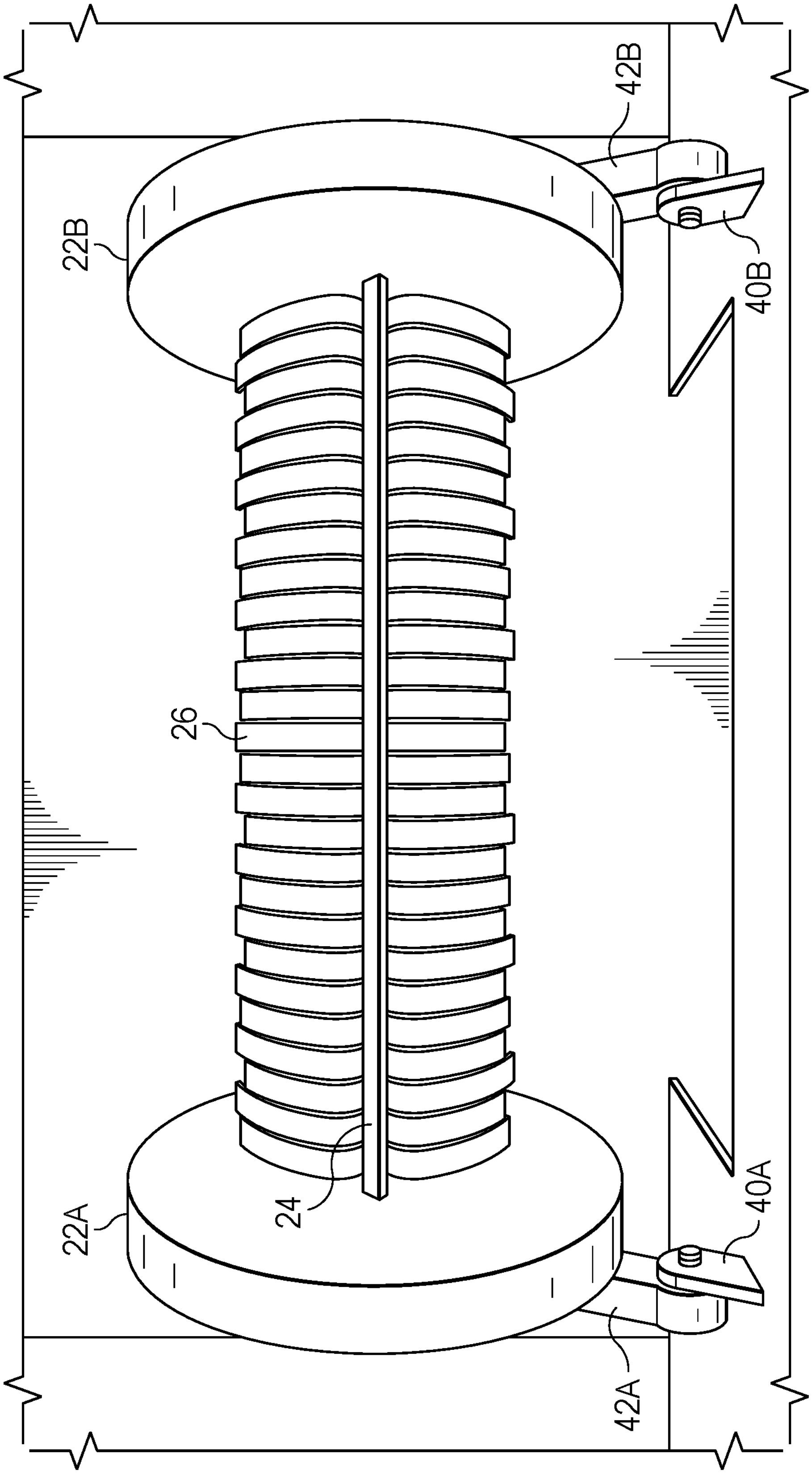
FIG. 6 is a top view of another exemplary embodiment of another exemplary rolling radiation shield installed in another exemplary fashion with the flexible strips of FIG. 5 fully installed at the axle and the shield installed inside an exemplary imaging system as viewed from inside the imaging system.
Figure 7:
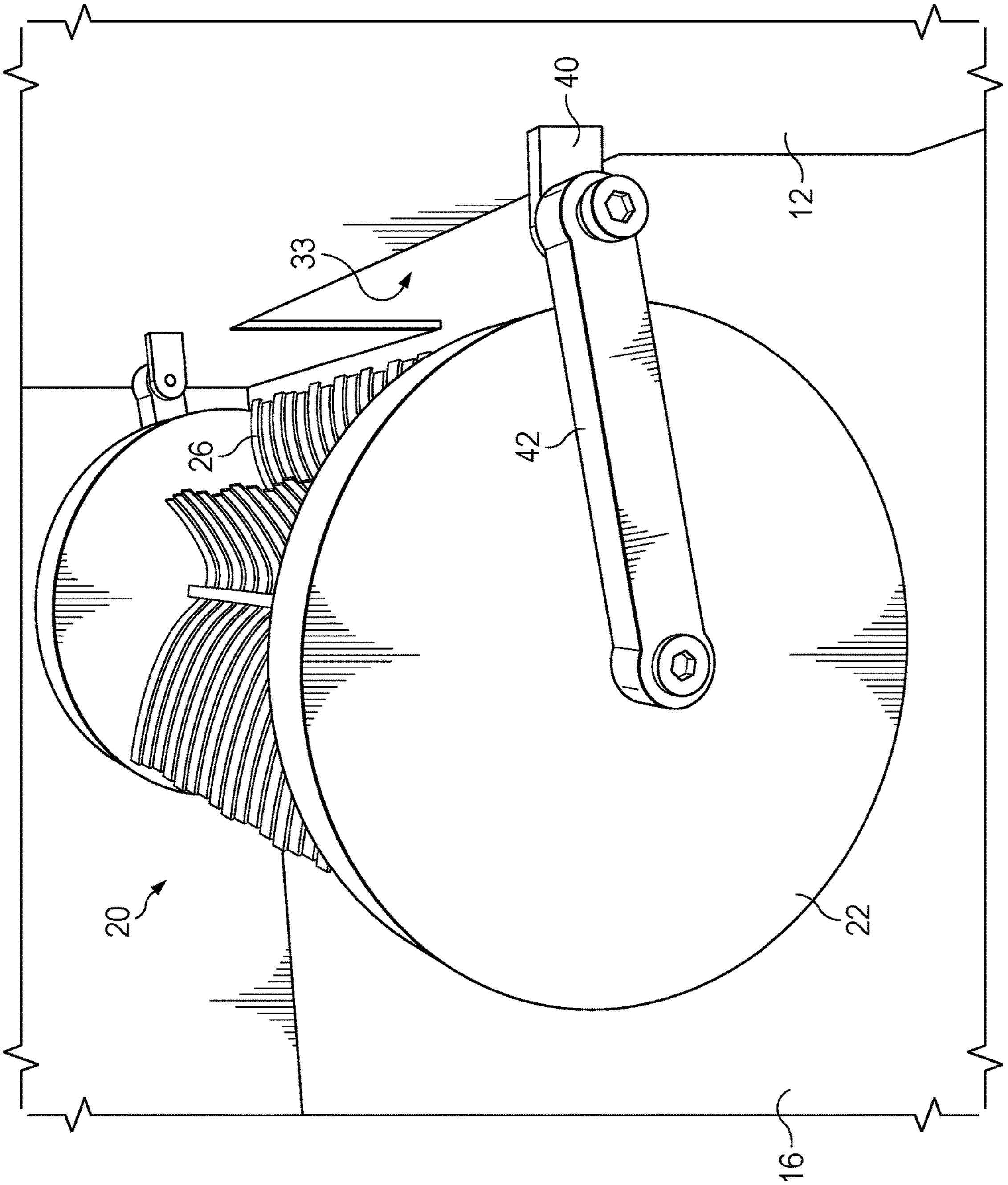
FIG. 7 is a perspective view from inside the imaging system of the rolling radiation shield of FIG. 6 as installed.

In other exemplary embodiments, the common portion 25 may be attached to a substrate 31, such as by way of one or more fasteners 33 (e.g., screws, pins, bolts, nails, combinations thereof, or the like), adhesive, combinations thereof, or the like. As illustrated with particular regard to FIG. 5 and FIG. 6, the substrate may be insertable into any of several notches 35 in the axle 24. The axle 24 may comprise four notches 35, such as for four substates 31, such as to provide at least four rows 27 of the strips 26 at the axle 24 when all notches 35 are filled. However, not all notches 35 need filled. Particularly as the flexible strips 26 may extend from either side of the common portion, this may provide large number of strips 26 for the shield 20, thereby providing significant (if not continuous) coverage of the entrance and/or exit 33 by the shield 20. As illustrated, the flexible strips 26 may extend from both sides of the common portion 25 and/or substrate 31.

FIG. 7 through FIG. 10 illustrates another exemplary embodiment of the shield 20 which is installed interior to the housing 12, such as inside and above the entrance and/or exit 33 of the imaging system 10. Installation, interior or exterior to the housing 12, may be by way of one or more brackets 40 and arms 42 which provide preferably jointed connection to the outer portions 22 and/or axle 24. In this fashion, the shield 20 may rotate in a generally upward or downward direction, such as to accommodate various size objects 18. Jointed connections may be provided by fasteners, such as pins, screws, bolts, combinations thereof, or the like, connecting the brackets 40 with the arms 42, the arms 42 with the outer portions 22 and/or the axle 24, combinations thereof, or the like.

The flexible strips 26 may rotate with the axle 24 which may likewise rotate with the first and second outer portions 22. Stated another way, the axle 24 may be rotationally fixed to the outer portion 22. The shield 20 may be installed such that the first and second outer portions 22 contact the conveyor 16. In this fashion, the outer portions 22 may be rotated with movement of the conveyor 16, which may in turn cause rotation of the axle 24 and the flexible strips 26. In this fashion, the shield 20 may be passively driven, such as by the conveyor 16.

While illustrated as installed extending inward from an interior surface of the housing 12, the shield 20 may be installed to an exterior surface of the housing 12 and/or partially inside and partially outside the housing 12.

The axle 24 may be fixed to the outer portions 22, and the axle 24 and/or outer portions 22 may be joined to the arms 42 in a fashion which permits independent rotational movement. In this fashion, a separate shaft 28 may not be required. However, the shaft may still be employed, such as within the axle 24 and connected to the arms 42.

Figure 8:
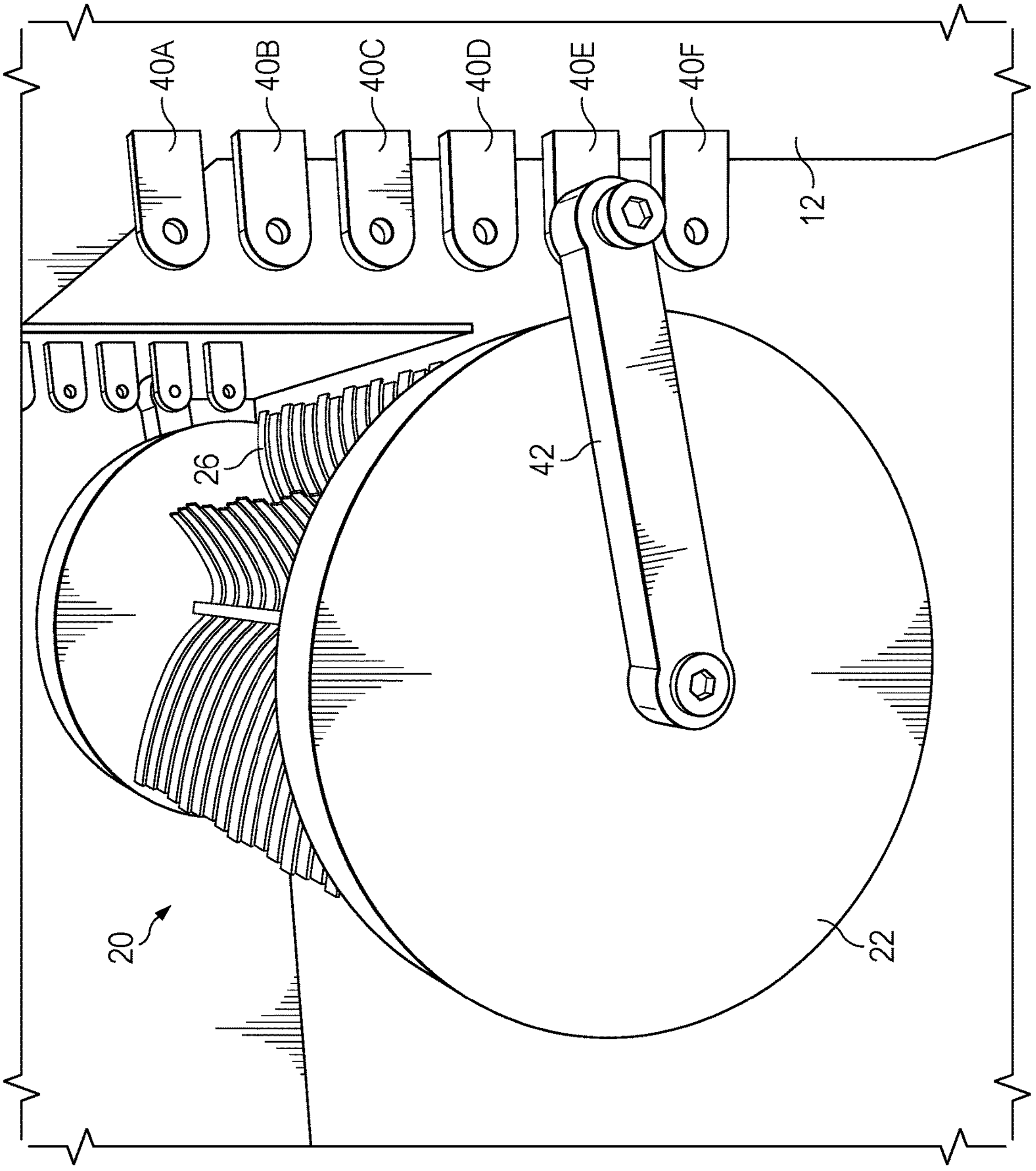
FIG. 8 is a perspective view from inside the imaging system of any other exemplary installation arrangement for the rolling radiation shield of FIG. 6.
Figure 9:
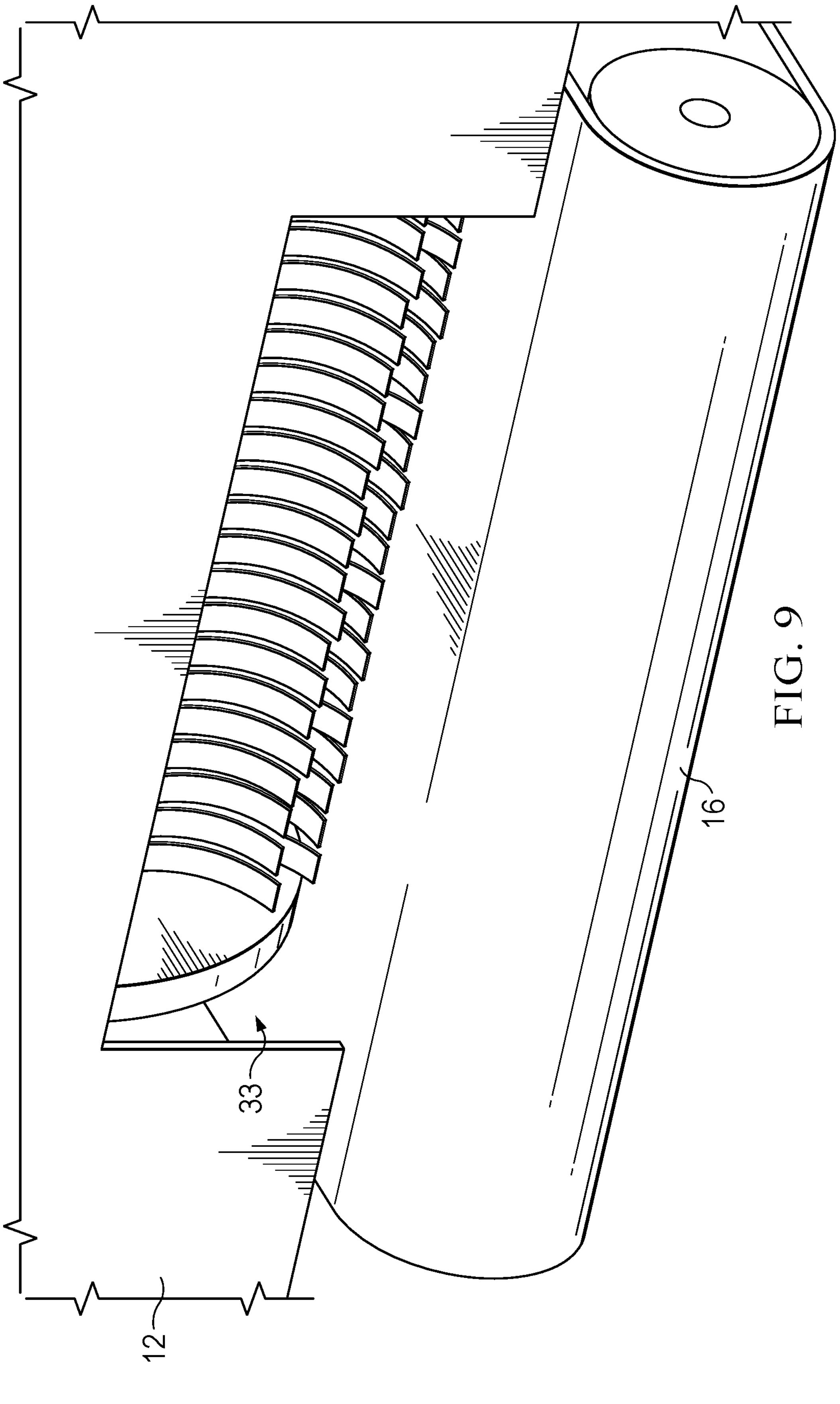
FIG. 9 is a perspective view from outside the imaging system of the rolling radiation shield of FIG. 6 as installed.

As illustrated with particular regard to FIG. 8, a series of spaced brackets 40A-40F may be provided along the housing 12, such as at an interior thereof, to secure the arms 42. This may allow the shield 20 to be installed at various heights and/or rotational angles.

Figure 10:
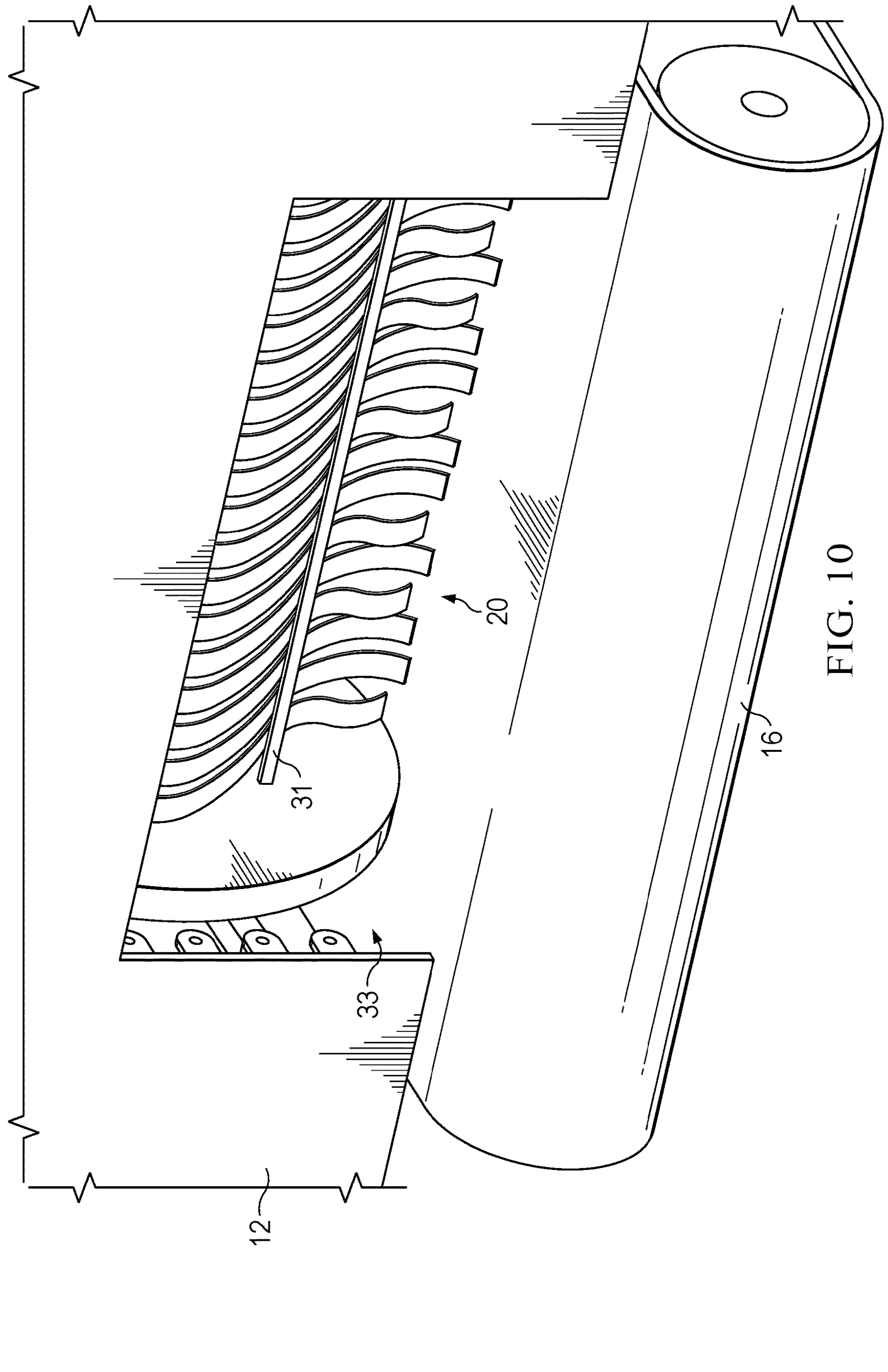
FIG. 10 is a perspective view from outside the imaging system of the rolling radiation shield of FIG. 8 in exemplary use.

FIG. 10 illustrates the rolling shield 20 in exemplary use. As the shield 20 turns, the substrate 31 may be exposed. As illustrated, the flexible strips 26 may extend from both sides of the common portion 25 and/or substrate 31, which may enhance coverage of the entrance and/or exit 33 during use.

Figure 11:
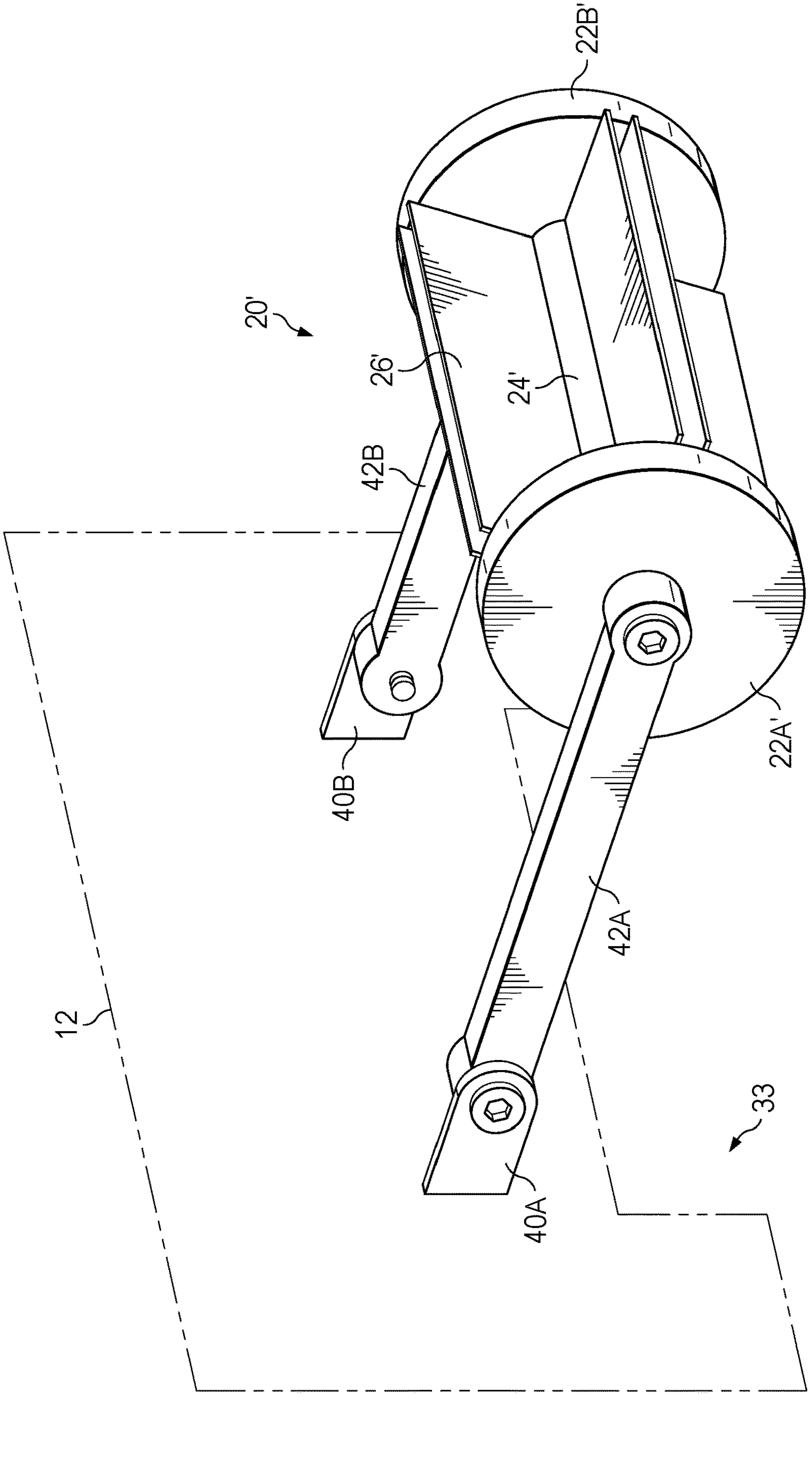
FIG. 11 is a perspective view from inside the imaging system of another exemplary rolling radiation shield and related mounting configuration, illustrated in isolation from other components.

FIG. 11 illustrates another exemplary embodiment of the shield 20', whereby similar features are numbered similarly with the addition of a prime (') (i.e., 22 to 22'). Sheets 26' may be used in place of, or in addition to, the flexible strips 26. The sheets 26' may be spaced apart between first and second outer portions 22A', 22B'. The sheets 26' preferably extend longitudinally along the shaft 28' and extend outward therefrom in a radial fashion. Preferably, the sheets 26' are spaced apart along an outer circumference of the shaft 28'. The sheets 26' may be relatively rigid, such as in comparison to the flexible strips 26, though such is not required. For example, without limitation, the sheets 26' may comprise a same material as the flexible strips 26, which may make the sheets 26' substantially as flexible as the flexible strips 26. In exemplary embodiments, without limitation, the sheets 26' may comprise a vinyl impregnated with one or more metals, such as relatively high-density metals, such as lead. Preferably, the sheets 26' are provided in multiple sets of relatively smaller spaced apart pairs. However, any number and arrangement of the sheets 26' may be utilized. The sheets 26' may be sized to contact the conveyor 16 when the shield 20 is installed, such as along with the outer portions 22A', 22B'. For example, without limitation the sheets 26' may beyond an outer edge of the outer portions 22A', 22B' such as to improve shielding. In other exemplary embodiments, without limitation, the sheets 26' may be substantially even with the outer edge of the outer portions 22A', 22B', such as to reduce friction. In still other exemplary embodiments, without limitation, the sheets 26' may be slightly recessed into the outer portions 22A', 22B', such that only the outer portions 22' contact the conveyor 16 for example.

The sheets 26' may be connected to the axle 24', such as by way of adhesive, fasteners, friction fit, combinations thereof, or the like. In exemplary embodiments, slots may be provided along the axle 24' to accommodate, and preferably secure, the sheets 26'. For example, the slots may comprise a relatively wide base portion configured to match a relatively wide base portion of the sheets 26'. The sheets 26' may be slid into the slots laterally which are then secured by addition of the outer portion(s) 22'. The relatively wide base may secure the sheets 26' within the slots.

The axle 24' may be connected to one or more arms 42 in a manner which permits rotation of the axle 24' (e.g., pin joints, bearings, etc.). The arms 42A, 42B may be connected to brackets 40A, 40B. The arms 42 and/or brackets 40 may be configured to permit relative movement, such as to allow vertical adjustment of the shield 20'. This may allow the shield 20' to better accommodate various size and/or shape objects 18 and/or improve shielding by increasing close contact with the objects 18. The brackets 40 may be connected to the housing 12 (interior or exterior portion thereof) and/or another surface.

Figure 12:
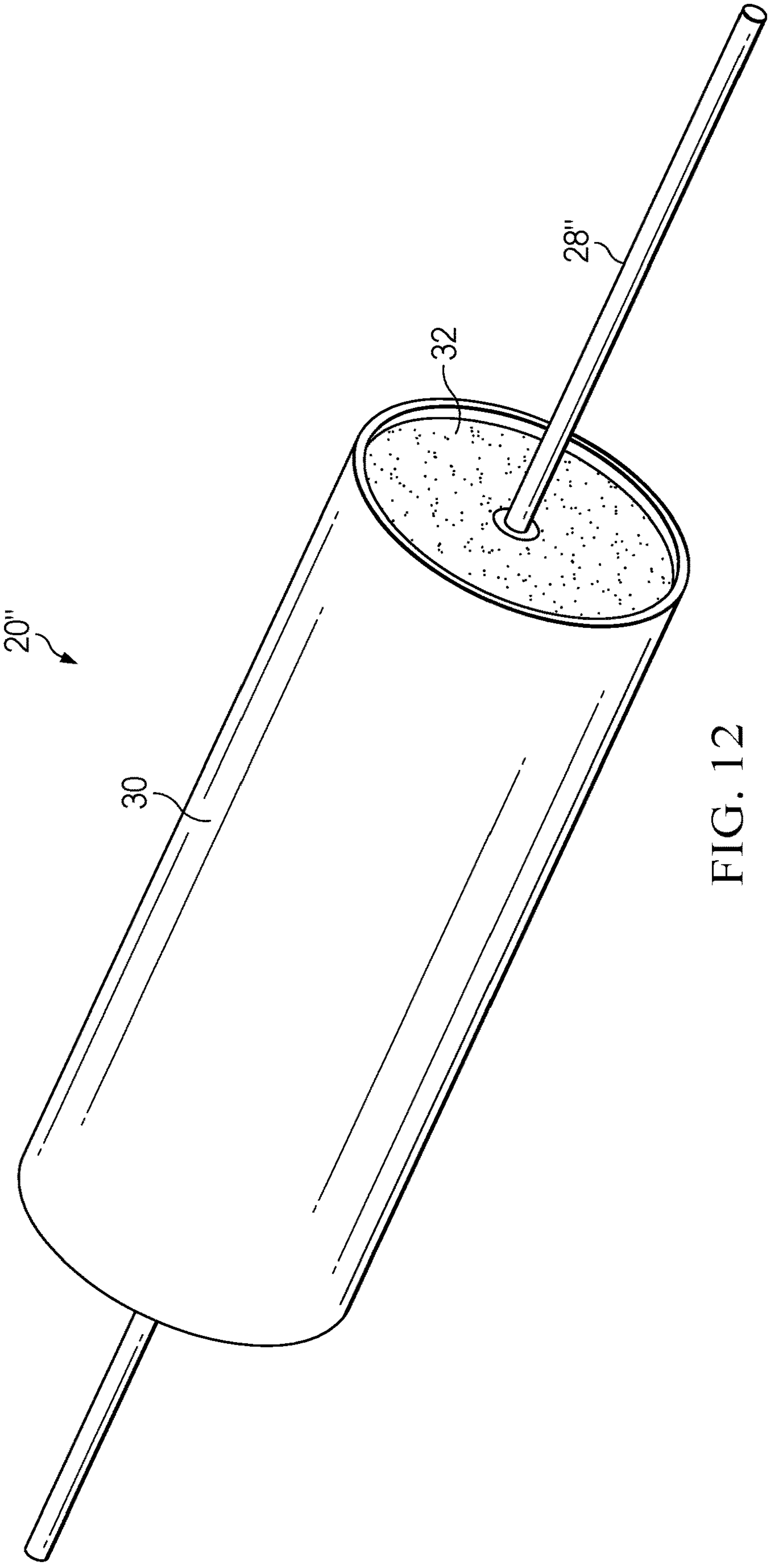
FIG. 12 is a perspective view of another exemplary rolling radiation shield, illustrated in isolation from other components.

FIG. 12 illustrates another exemplary embodiment of the shield 20", whereby similar features are numbered similarly with the addition of a second prime (") (i.e., 22 to 22" or 22' to 22"). The shield 20" may comprise a shaft 28". The shaft 28" may be connected, directly or indirectly, to the housing 12 or another surface. The shield 20" may comprise an outer portion 30 and inner portion 32. The outer portion 30 may provide a full or partial shell for the inner portion 32 which is disposed therein. In exemplary embodiments, without limitation, the outer portion 30 comprises a hollow cylinder shape and the inner portion 32 comprises a hollow cylinder shape. Preferably, the inner portion 32 is configured to fit within the outer portion 30 and accommodate the shaft 28". The inner and outer portion 32, 30 may comprise substantially (e.g., within 20%) the same axial length. The shaft 28" may protrude therefrom.

In exemplary embodiments, the outer portion 30 may comprise one or more materials which provide radiation shielding. The inner portion 32 may comprise a foam. However, either or both of the inner and outer portions 32, 30 may comprise one or more materials which provide radiation shielding. The outer portion 30 and/or inner portion 32 may be relatively deformable, such as to accommodate various objects 18 passing beneath. The inner portion 32 and/or outer portion 30 may be configured to rotate free of the shaft 28" or with the shaft 28". Preferably, the shaft 28" is connected to the housing 12 or other surface by way of a jointed connection (e.g., arms 42 and/or brackets 40) to allow vertical adjustment of the shield 20". In this way, the shield 20" may essentially roll over objects 18 as they pass underneath. In other exemplary embodiments, the inner portion 32 and/or outer portion 30 may comprise a compressible material, such that objects 18 may deform the inner portion 32 and/or outer portion 30 as they travel beneath. In such embodiments, the shaft 28" may be fixed vertically, though such is not required.

While passive operation of the rolling radiation shield 20, 20', 20", such as by contact with the conveyor 16 and/or objects 18 is sometimes shown and/or described, the shield 20, 20', 20" may be actively operated, such as by way of one or more motors, belts, chains, drive shafts, combinations thereof, or the like.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

What is claimed is:

1. A rolling radiation shield comprising:
a first outer portion;
a second outer portion spaced apart from the first outer portion, wherein each of the first and second outer portion have a circular shape for contacting a conveyor upon installation of the rolling radiation shield at an imaging machine such that movement of the conveyor causes rotational movement of the first and second outer portion;
an axle connecting the first outer portion and the second outer portion for rotational movement therewith; and
material configured to attenuate radiation attached to the axle for rotational movement therewith.

2. The rolling radiation shield of claim 1 wherein:
the material comprises flexible strips;
the flexible strips are arranged in rows, each of which extends along a longitudinal axis of the axle; and
said rows are spaced apart about a circumference of the axle.

3. The rolling radiation shield of claim 2 further comprising:
notches provided in the axle;
common portions, each connecting the flexible strips of a respective one of the rows; and
substrates, each connected to a respective one of the common portions of the respective one of the rows, where the substrates are each insertable into one of the notches of the axle to secure the flexible strips to the axle.

4. The rolling radiation shield of claim 2 further comprising:
a shaft extending through a hollow portion of the axle.

5. The rolling radiation shield of claim 1 wherein:
the material comprises a series of sheets spaced apart circumferentially at the axle and extending radially outward therefrom.

6. A system for providing radiation shielding at an imaging machine, said system comprising:
the imaging machine comprising a housing, an imaging device located within the housing which emits and detects radiation when activated, and a conveyor for moving objects through the housing and within imaging distance of the imagining device; and
the rolling radiation shield of claim 1 positioned at an entrance or an exit to the housing:
such that the first and second outer portion contact the conveyor.

7. The system of claim 6 wherein:
the material comprises flexible strips attached to the axle;
the flexible strips are arranged in rows, each of which extends along a longitudinal axis of the axle; and
said rows are spaced apart about a circumference of the axle.

8. The system of claim 7 further comprising:
notches provided in the axle;
common portions, each connecting the flexible strips of a respective one of the rows; and
substrates, each connected to a respective one of the common portions of the respective one of the rows, where the substrates are each insertable into one of the notches of the axle to secure the flexible strips to the axle.

9. The system of claim 8 further comprising:
first and second arms connected in a jointed fashion to the axle; and
brackets fixed to an interior of the housing and connected to the first and second arms in a jointed fashion.

10. The system of claim 9 wherein:
the brackets are provided in two sets, wherein the brackets of each of the two sets are spaced apart vertically from one another at the interior of the housing to provide height adjustable installation.

11. The system of claim 6 wherein:
the radiation attenuating material comprises a series of sheets spaced apart circumferentially at the axle and extending radially outward therefrom.

12. The system of claim 11 wherein:
the series of sheets are arranged in pairs; and
each of the sheets are secured within slots in the axle.

13. A method for providing radiation shielding at an imaging machine, said method comprising:
placing objects on a conveyor which extends through a housing of the imaging machine for an imaging device, where the rolling radiation shield of claim 1 is installed at an entrance or exit to the housing such that the first and second outer portion contact the conveyor; and
activating the conveyor to move the objects into the housing for imaging by the imaging device, where activation of the conveyor causes rotational movement of the rolling radiation shield by way of the contact between the first and second outer portion and the conveyor.

14. The method of claim 13 wherein:
the material comprises flexible strips attached to the axle;
the flexible strips are arranged in rows, each of which extends along a longitudinal axis of the axle; and
said rows are spaced apart about a circumference of the axle.

15. The method of claim 14 wherein:
said rolling radiation shield is connected to in interior of said housing of said imaging machine by:
first and second arms connected in a jointed fashion to the axle; and
brackets fixed to the housing and connected to the first and second arms in a jointed fashion.

16. The method of claim 15 wherein:
said rolling radiation shield comprises:
notches provided in the axle;
common portions, each connecting the flexible strips of a respective one of the rows; and
substrates, each connected to a respective one of the common portions of the respective one of the rows, where the substrates are each insertable into any one of notches of the axle to secure the flexible strips to the axle.

17. The method of claim 13 wherein:
the radiation attenuating material comprises a series of sheets spaced apart circumferentially at the axle and extending radially outward therefrom.

18. The method of claim 17 wherein:
the series of sheets are arranged in pairs.

19. A rolling radiation shield comprising:
a first outer portion;
a second outer portion spaced apart from the first outer portion, wherein each of the first and second outer portion have a circular shape;
an axle connecting the first outer portion and the second outer portion; and
material configured to attenuate radiation attached to the axle, wherein the material comprises:

flexible strips arranged in rows, each of which extends along a longitudinal axis of the axle, and said rows are spaced apart about a circumference of the axle; or a series of sheets spaced apart circumferentially at the axle and extending radially outward therefrom.

20. A rolling radiation shield comprising:

an axle;

an inner portion having a cylindrical shape located about the axle; and an outer portion having a cylindrical shape located about the inner portion for contacting a conveyor upon installation of the rolling radiation shield at an imaging machine such that movement of the conveyor causes rotational movement of at least the outer portion, wherein the outer portion, or a space between the inner portion and the outer portion, comprises a material which attenuates radiation.

* * * * *